June 20, 1967  G. E. RIZZO ETAL  3,325,933
STRIP MAP HOLDER AND VIEWER
Filed June 15, 1965  2 Sheets-Sheet 1
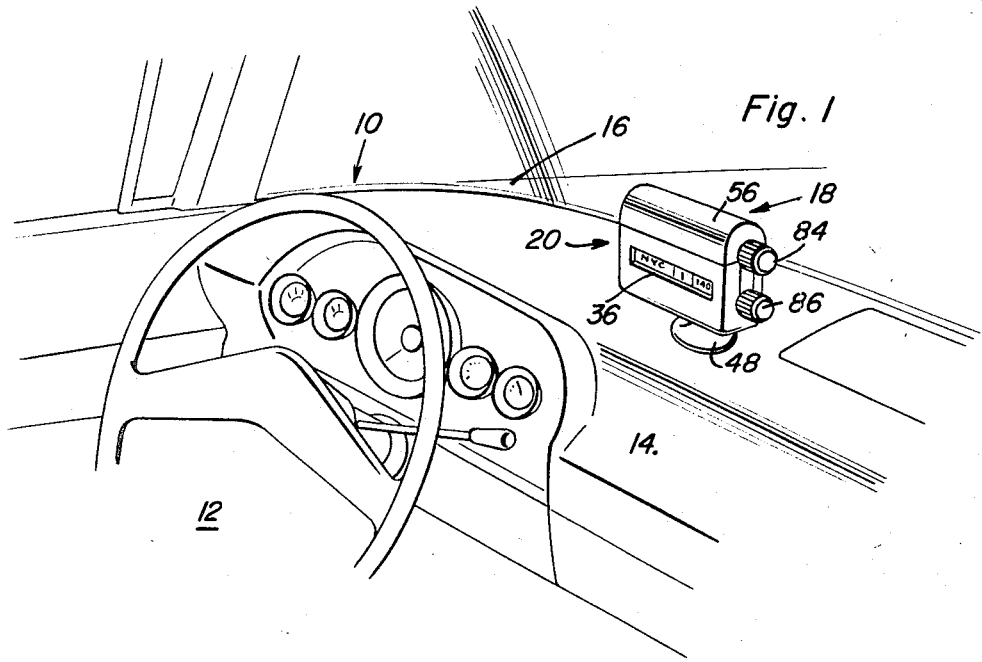
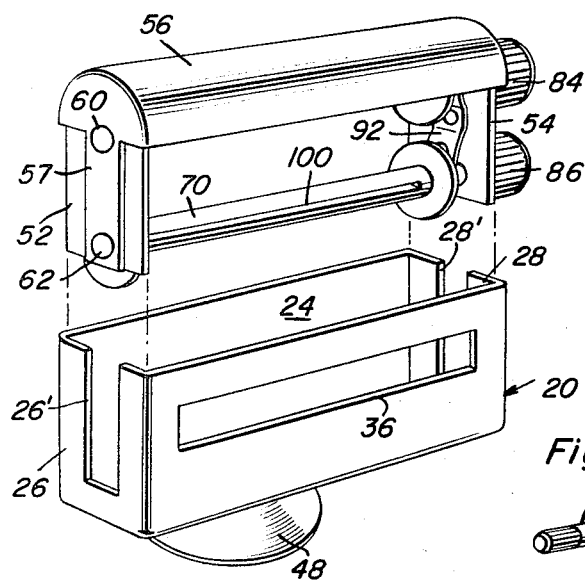
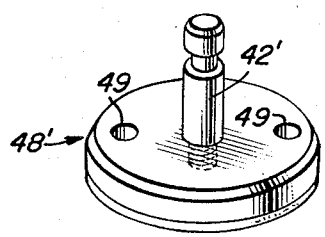
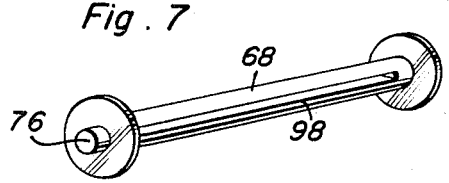
George E. Rizzo
John A. Veit
Joseph E. Ludick
INVENTORS

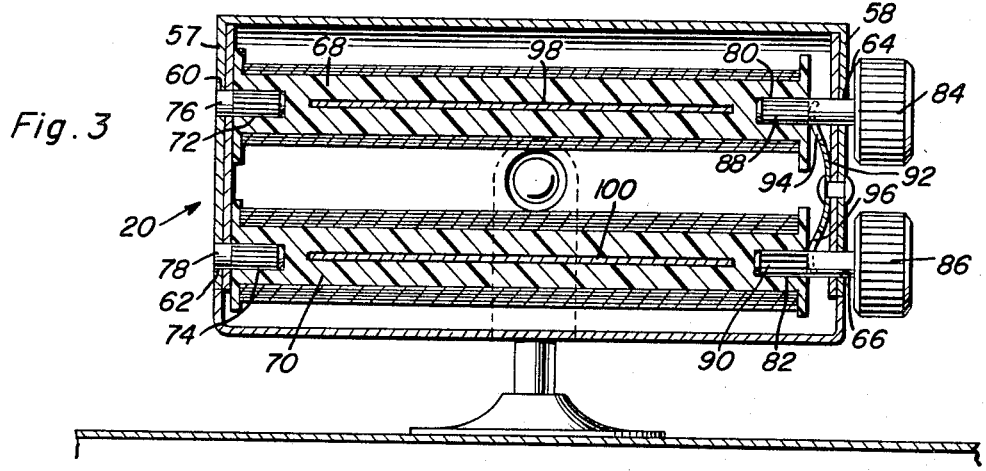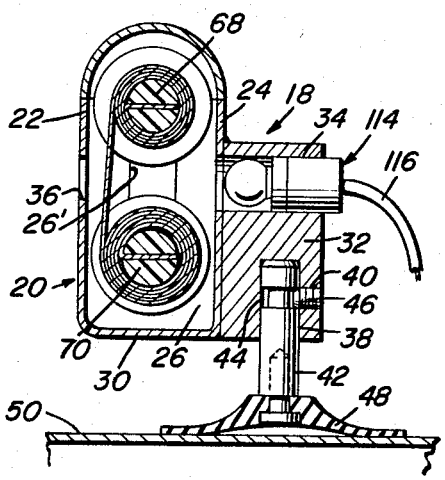

United States Patent Office 3,325,933
Patented June 20, 1967

3,325,933
STRIP MAP HOLDER AND VIEWER
George E. Rizzo, 1580 NE. 139th St.; John A. Veit, 1361 NE. 149th St.; and Joseph E. Ludick, 12595 NE. 7th Ave., all of North Miami, Fla. 33161
Filed June 15, 1965, Ser. No. 464,130
13 Claims. (Cl. 40—86)

ABSTRACT OF THE DISCLOSURE

A holder for strip material having opposite ends wound upon relatively rotatable generally parallel rollers journaled from a supporting frame receivable in the open end of an open ended housing structure, the walls of the housing opposing the opposite ends of the rollers including slots communicating with the open side of the housing and the portions of the frame from which corresponding ends of the rollers are journaled including rib portions longitudinally keyed in said slots.

---

This invention relates to a novel and useful strip map holder and viewer and more specifically to an apparatus designed to eliminate the necessity of drivers of various vehicles having to refer to conventional road maps and the like which illustrate large plan areas and which are conventionally folded many times for compact storage purposes.

Conventional road maps of the folded type are extremely difficult for the driver of a vehicle to follow and in most instances, while the driver of a vehicle should pull off to one side of the road and stop before referring to the map, the inconvenience in stopping tempts the driver to attempt to read the map without stopping. The difficulty in reading a folded map is further magnified in some instances as the road, on the map, along which a driver is traveling will extend from one folded panel of the map to an adjacent panel requiring that the folded map be substantially completely unfolded and perhaps refolded in an incorrect manner before the said adjacent panel of the map may be readily viewed.

Further, while some automobile associations and clubs as well as gasoline manufactuers will provide the driver of a vehicle with a small booklet containing numerous pages on which consecutive sections of a strip map are printed, even these small booklets can be difficult to follow by a person driving a motor vehicle.

Although the strip map holder and viewer of the instant invention is designed primarily to assist drivers of motor vehicles, it may also serve useful purposes of operators of airplanes and small boats as well as other vehicles of travel.

It is accordingly the main object of this invention to provide a strip map holder and viewer designed primarily for the purpose of providing a means whereby the driver of a motor vehicle may instantly, at a glance, make reference to the desired section of a strip map thereby enabling the driver of the vehicle to make continued reference to the strip map while the vehicle he is operating is in motion.

Although the aforementioned conventional type of strip map contained in special booklets or pamphlets may be more readily referred to than the conventional folded road maps which cover a large plan area, they are still dangerous and doubly so since strip maps are designed in a manner suggesting that they be viewed by a driver while operating his vehicle.

Road lanes are approximately 13 feet wide and medium size vehicles are approximately 6 feet wide. Assuming that a six foot wide vehicle is in the center of a 13-foot lane, three and a half feet of clearance is provided on each side of the automobile or vehicle. The main controlling factor over the direction in which a vehicle is moved are the steerable wheels of the vehicle although wind, road crown and other factors also have a tendency to cause a vehicle to veer in one direction or the other.

Assuming that the steerable wheels of a vehicle are deflected only one degree out of their proper direction of movement, a vehicle travelling at 30-miles an hour and in the center of a 13-foot roadway lane, will move laterally to the extreme margin of that lane in approximately 4½ seconds. Of course, one degree of deflection of the steerable wheels of a vehicle is not too great and a driver not giving substantially his total attention to his task of driving may readily inadvertently cause the steerable wheels to be deflected as much as 3 degrees without realizing his error. Of course, in this instance it would take only one and one-half seconds for the vehicle to move laterally to the extreme margin of the roadway lane. Still further, should the speed of the automobile be approximately 60 miles an hour, similar conditions would cause that automobile to move to the extreme margin of the roadway lane in approximately three-quarters of a second. Accordingly, it may be seen that any appreciable increase in the ability of a road map being more readily used will greatly reduce the possibility of a driver referring to a road map entering a dangerous situation such as drifting toward either extreme margin of his roadway lane.

Another object of this invention is to provide a strip map holder and viewer for holding conventional strip means for ready viewing by the driver of a vehicle and also somewhat modified strip maps for use in connection with the holder and viewer which do not provide a conventional type of road map for viewing by the driver of the vehicle but which provide only a list of the larger cities and towns along the desired route with the route number from each town to the next town and the total mileage to be covered from each town to the next town. By using this type of simplified map or direction, the driver of a vehicle may readily check his next destination, the route over which he must travel to reach that next destination and the number of miles which he must cover to reach the next destination. Such information may be readily viewed at a glance requiring only a small fraction of one second of the driver's attention.

A still further object of this invention is to provide a strip map holder and viewer with illumination means whereby the viewer of the instant invention may be readily viewed during the hours of darkness.

A final object of this invention is to provide a strip map holder and viewer in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the interior of a conventional form of motor vehicle shown with the strip map holder and viewer of the instant invention mounted on the dashboard of the vehicle;

FIGURE 2 is an exploded perspective view of the strip map holder and viewer;

FIGURE 3 is an enlarged vertical sectional view of the strip map holder and viewer illustrated in FIGURE 1 and taken substantially upon a plane passing through the center of the viewer;

FIGURE 4 is a transverse vertical sectional view taken substantially upon a plane passing through the center of the viewer as illustrated in FIGURE 3;

FIGURES 5 and 6 are fragmentary plan views of two forms of strip maps adapted to be utilized in connection with the viewer of the instant invention;

FIGURE 7 is a perspective view of one of the rollers of the viewer;

FIGURE 8 is a perspective view of one of the drive knobs for the rollers of the viewer; and FIGURE 9 is a perspective view of one form of mounting base for the viewer of the instant invention.

With attention now directed more specifically to the drawings the numeral 10 generally designates a conventional form of motor vehicle including a driver's compartment 12 having a dashboard 14 disposed immediately rearwardly of a windshield 16.

The strip map holder and viewer of the instant invention is generally designated by the reference numeral 18 and is mounted on the dashboard 14 in a position whereby it may be readily viewed by the driver of the vehicle 10.

With attention directed now more specifically to FIGURES 2–4 of the drawings it may be seen that the strip map holder and viewer 18 includes a generally rectangular housing referred to in general by the reference numeral 20 including front and rear walls 22 and 24 interconnected by means of a pair of opposite end walls 26 and 28 and by means of a bottom wall 30.

A mounting boss 32 projects rearwardly of the rear wall 24 and has a bore 34 formed therethrough whose inner end opens into the housing 20 in substantial horizontal alignment with a viewing window 36 formed in the front wall 22 of the housing 20. In addition, the boss 32 includes a downwardly opening blind bore 38 with which the inner end of a horizontally disposed threaded bore 40 is communicated. A mounting stand comprising an upright stud 42 is provided and has its upper end snugly received in the blind bore 38 and includes a diametrically reduced portion 44 defined by a circumferential groove in which a setscrew 46 threadedly engaging the bore 40 is seated. The lower end of the stud 42 has a suction cup 48 secured thereto in any convenient manner and the suction cup 48 is secured in the conventional manner to the upper surface 50 of the dashboard 14.

As can best be seen from FIGURE 2 of the drawings a frame including a pair of end members 52 and 54 is provided and a means defining a closure or top wall 56 extends between and interconnects the end members 52 and 54 and supports the latter in fixed spaced relation relative to each other.

The opposite end walls 26 and 28 have upwardly opening slots 26' and 28' formed therein and the end members 52 and 54 are receivable within the housing 20 between the end walls 26 and 28. The end members 52 and 54 include parallel outwardly and oppositely projecting ribs 57 and 58, respectively, which are snugly and slidably received in the corresponding notches 26' and 28'.

The end member 52 has a pair of vertically spaced bores 60 and 62 formed therein and the end member 54 has a corresponding pair of vertically spaced bores 64 and 66 formed therethrough. A pair of rollers 68 and 70 are provided and include corresponding axially extending blind bores 72 and 74 in one pair of corresponding ends thereof in which the inner ends of a pair of outwardly projecting stub axle portions 76 and 78, respectively, are secured. The outwardly projecting ends of the stub axle portions 76 and 78 are rotatably received in the bores 60 and 62. In addition, the rollers 68 and 70 include a pair of corresponding axial blind bores 80 and 82 on the ends thereof remote from the bores 72 and 74. A pair of turning knobs 84 and 86 are provided and include stub shafts 88 and 90 which are rotatably received through the bores 64 and 66 and have their free end portions removably secured in the bores 80 and 82.

The rollers 68 and 70 are shorter than the distance between the end members 52 and 54 by an amount greater than the length of the extended end portions of the stub axle portions 76 and 78. Further, a leaf spring 92 is provided and secured to the end member 54 and includes bifurcated end portions 94 and 96 which bear against the corresponding ends of the rollers 68 and 70 to urge the latter to the left as viewed in FIGURE 3 of the drawings. Accordingly, the stub axle portions 76 and 78 are maintained within the bores 60 and 62.

The rollers 68 and 70 are slotted as at 98 and 100 to receive the corresponding narrowed ends 102 and 104 of the strip 106 illustrated in FIGURE 5 of the drawings or the narrowed end 108 and the corresponding narrowed end (not shown) on the opposite end of the strip 110 illustrated in FIGURE 6. In this manner, the strips 106 and 110 may be readily removably engaged with the rollers 68 and 70 in order that the strip may be caused to move from one roller to the other as the knobs 84 and 86 are rotated.

With attention now invited to FIGURE 9 of the drawings there may be seen a modified form of mount including a stud 42' corresponding to the stud 42 and whose lower end is threadedly secured to a suitable apertured base generally referred to by the reference numeral 48' including a pair of apertures 49 through which suitable fasteners may be secured in order to secure the base 48' to the dashboard 14.

In operation, the frame comprising the end members 52 and 54 and the closure 56 may be removed from the housing 20 as illustrated in FIGURE 2 of the drawings and the desired strips 106 or 110 may be operatively engaged with the rollers 68 and 70 in the conventional manner. Then, the frame may be reinserted within the housing 20 in order that the desired portion of the selected strip may be viewed through the viewing window 36. As the driver of the vehicle 10 reaches each destination on the strips 106 and 110, the appropriate knob of the viewer 18 may be turned in order to advance the strip so that the next destination is aligned with the viewing window 36.

In order that the viewer 18 may be used during the hours of darkness, a light assembly generally referred to by the reference numeral 114 is removably secured within the bore 34 and may be electrically connected to any suitable source of electrical potential (not shown) by means of the electrical conductors 116. Thus, it may be seen that the viewer 18 of the instant invention may be readily referred to by the driver of the vehicle 10 in order to check his next destination, the route he must follow to arrive at the next destination and the total number of miles he will have to cover before the next destination is reached.

Further, it may be seen from FIGURES 5 and 6 of the drawings that the strip 106 is designed for motor vehicular travel while the strip 110 is designed to be utilized in connection with aircraft.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A strip map holder and viewer including a housing having one open side and a viewing window in one wall thereof, a support frame including a pair of end members, means interconnecting and supporting said end members in fixed relation relative to each other, a pair of generally parallel supporting rollers extending between and journaled from said end members, said support frame being positioned in said housing in a manner such that a strip of material extending between said rollers may be viewed through said viewing window, one wall of said housing adjacent said open side thereof having a slot formed therein extending toward and communicated with said open side, one pair of corresponding ends of said rollers including endwise outwardly projecting drive knobs projecting outwardly of the corresponding end member and slidably and rotatably received through said slot whereby said rollers may be selectively manually driven from the exterior of said housing, the side of said housing remote from said one wall having a second slot formed therein paralleling the first mentioned slot and also communicated with said open side, said end members including means defining outwardly projecting elongated ribs snugly and slidably received in said slots.

2. The combination of claim 1 wherein said the other pair of corresponding ends of said rollers include endwise outwardly projecting stub axle portions journaled on the corresponding end member.

3. The combination of claim 1 wherein said means interconnecting said end members include means defining a closure for the open side of said housing.

4. The combination of claim 1 wherein said ribs are seated in said slots.

5. The combination of claim 1 wherein said drive knobs include inwardly projecting stub shafts, said one pair of ends of said rollers including blind axial bores in which said stub shafts are secured.

6. The combination of claim 1 wherein said housing includes a wall opposite said one wall, illuminating means supported from said wall opposite said one wall and operable to cast light between said rollers and on the inner side of the portion of said strip of material registered with said window.

7. The combination of claim 4 wherein said means interconnecting said end members includes means defining a closure for the open side of said housing.

8. The combination of claim 5 wherein said the other pair of corresponding ends of said rollers including endwise outwardly projecting stub axle portions journaled in the corresponding end member, said stub shafts being axially slidably received through the corresponding end member and said rollers being shorter than the distance between said end members by an amount greater than the length of said stub axle portions, means connected between one of said end members and said rollers yieldingly urging said rollers axially toward the side of said housing remote from said one wall thereof.

9. The combination of claim 8 wherein said stub shafts are removably secured in said blind bores.

10. A strip map holder and viewer including a housing having one open side and a viewing window in one wall thereof, a support frame including a pair of end members, means interconnecting and supporting said end members in fixed relation relative to each other, a pair of generally parallel supporting rollers extending between and journaled from said end members, said support frame being positioned in said housing in a manner such that a strip of material extending between said rollers may be viewed through said viewing window, one wall of said housing adjacent said open side thereof having a slot formed therein extending toward and communicated with said open side, one pair of corresponding ends of said rollers including endwise outwardly projecting drive knobs projecting outwardly of the corresponding end member and slidably and rotatably received through said slot whereby said rollers may be selectively manually driven from the exterior of said housing, said drive knobs including inwardly projecting stub shafts, said one pair of ends of said rollers including blind axial bores in which said stub shafts are secured, said other pair of corresponding ends of said rollers including endwise outwardly projecting stub axle portions journaled in the corresponding end member, said stub shafts being axially slidably received through the corresponding end member and said rollers being shorter than the distance between said end members by an amount greater than the length of said stub axle portions, means connected between one of said end members and said rollers yieldingly urging said rollers axially toward the side of said housing remote from said one wall thereof, said stub shafts being removably secured in said blind bores, the side of said housing remote from said one wall having a second slot formed therein paralleling the first mentioned slot and also communicated with said open side, said end members including means defining outwardly projecting elongated ribs snugly and slidably received in said slots.

11. The combination of claim 10 wherein said ribs are seated in said slots.

12. The combination of claim 11 wherein said means interconnecting said end members includes means defining a closure for the open side of said housing.

13. A viewer including a housing having one open side and a viewing window in one wall thereof, a support frame including a pair of end members, means interconnecting and supporting said end members in fixed relation relative to each other, a pair of generally parallel supporting rollers extending between and journaled from said end members, said support frame being positioned in said housing in a manner such that a strip of material having its opposite ends wound on said rollers and extending between said rollers may have a portion thereof viewed through said viewing window, one wall of said housing adjacent said open side having a slot formed therein extending toward and communicated with said open side, one pair of corresponding ends of said rollers including endwise outwardly projecting drive knobs projecting outwardly of the corresponding end member and slidably and rotatably received through said slot whereby said rollers may be selectively manually driven from the exterior of said housing, the side of said housing remote from said one wall having a second slot formed therein paralleling the first mentioned slot and also communicated with said open side, said end members including means defining outwardly projecting elongated ribs snugly and slidably received in said slots.

References Cited

UNITED STATES PATENTS

| 557,024 | 3/1896 | Richard | 40—86 |
| 625,844 | 5/1899 | Kelso | 40—86 |
| 786,610 | 4/1905 | Terry | 40—86 |
| 1,729,480 | 9/1929 | Hale | 40—86 |
| 2,221,451 | 11/1940 | Jones | 40—86 |
| 2,498,476 | 2/1950 | Alfonso | 40—86 |

FOREIGN PATENTS 953,335  5/1949  France.

EUGENE R. CAPOZIO, *Primary Examiner.*

W. J. CONTRERAS, *Assistant Examiner.*